United States Patent [19]

Gray

[11] 3,946,707

[45] Mar. 30, 1976

[54] ELECTRONIC VEHICLE SPEED CONTROL

[75] Inventor: Larry O. Gray, Greens Fork, Ind.

[73] Assignee: Dana Corporation, Toledo, Ohio

[22] Filed: July 24, 1974

[21] Appl. No.: 491,444

[52] U.S. Cl. ........................... 123/102; 180/105 E
[51] Int. Cl.² .................. F02D 11/10; B60K 27/00
[58] Field of Search ..................... 123/102; 180/105

[56] References Cited
UNITED STATES PATENTS

| | | | |
|---|---|---|---|
| 3,556,245 | 1/1971 | Radin ................................. | 180/105 |
| 3,575,256 | 4/1971 | Jania .................................. | 123/102 |
| 3,645,241 | 2/1972 | Huntzinger ........................ | 123/102 |
| 3,667,020 | 5/1972 | Senzaki .............................. | 123/102 |
| 3,682,145 | 8/1972 | Ohtani ............................... | 123/102 |
| 3,766,895 | 10/1973 | Voss .................................. | 123/102 |

*Primary Examiner*—Charles J. Myhre
*Assistant Examiner*—Ronald B. Cox
*Attorney, Agent, or Firm*—Robert E. Pollock

[57] ABSTRACT

Disclosed is an electronic vehicle speed control with a fluid actuating means. Typically the actuating force is derived from the vehicle engine manifold vacuum applied selectively to a bellows operatively connected to the throttle mechanism. A dead-band type control is provided. When the actual vehicle speed is below the dead band range a valve is operated to allow the control fluid to increase the throttle setting. When the vehicle speed is above the dead band range a valve is operated to allow the control fluid to decrease the vehicle setting. In the preferred and specifically described circuit a circuit is provided to translate a contact closure rate into a D. C. voltage proportional to vehicle speed. A constant current source drives a series circuit including a speed set potentiometer and a dead-band setting resistor. The set speeds at either end of the dead band are compared to the actual speed and vacuum is "admitted" to or "dumped" from the bellows to return the actual speed within the dead band. Such a system provides very satisfactory control while affecting engine operation much less than a conventional vacuum powered vehicle speed control. Several novel safety and operational sub-circuits are also provided.

9 Claims, 3 Drawing Figures

ELECTRONIC VEHICLE SPEED CONTROL

BACKGROUND OF THE INVENTION

This invention relates to vehicle speed controls and more particularly to such controls using electronic logic and fluid powered actuating means.

Vehicle speed controls have been known for some time and have been widely accepted. Because of their economics, reliability and accuracy, fluid actuated speed controls have become the dominant factor in this market. Such controls typically use vacuum from the vehicle engine manifold as the actuating force. The vacuum is applied to a bellows connected to the throttle linkage and thereby increases or decreases the throttle position to advance or retard the vehicle speed. The control for such a system compares actual vehicle speed with desired vehicle speed and adjusts the vacuum level in the bellows accordingly. Typically, the control is via a continuous modulated bleed of atmospheric air into the bellows. Such a bleed looks, to the engine, like a leak in the manifold gasketing and is somewhat detrimental to engine performance. This has not been a major problem in the past when typical vehicles having speed controls used large engines and were tuned in a range which allowed relatively wide latitude in fuel/air ratio.

Recently the average size of engines in vehicles equipped with speed controls has been decreasing. In addition engine tuning has been modified toward lean fuel/air ratios. Both of these factors have made it more critical to limit the amount of atmospheric bleed reaching the engine manifold. Because of their simplicity and wide acceptance, however, it remains desirable to use speed controls having operators utilizing engine vacuum for actuation.

Accordingly, it is an object of this invention to provide a vacuum actuated vehicle speed control which effects a minimum atmospheric bleed to the vehicle engine manifold.

It is a further object to provide such a speed control which is accurate to the high standards of previous units.

It is still a further object to provide such a speed control which includes a plurality of convenience and safety features for safe simple operation.

SUMMARY OF THE INVENTION

Broadly, the invention is an electronic control for the speed of a vehicle with an internal combustion engine or the like including a vacuum source, typically the engine intake manifold. In the conventional manner a vacuum actuation member such as a bellows is connected to the engine throttle linkage. The bellows is selectively in communication with either the vacuum source or atmosphere thereby increasing or decreasing, respectively, the throttle setting and vehicle speed. A dead-band is built into the control circuit to allow the actual vehicle speed to drift over a narrow range (e.g., + or − ½ M.P.H.) around the set point speed without any control action taking place. Such a system, compared with conventional proportional vacuum actuated systems allows much less atmospheric bleed into the vacuum source. This is especially important with small engines and/or in engines which are tuned to run "lean" as such engines are particularly sensitive to the effect of atmospheric bleed.

In a typical system, a pair of solenoid valves are provided. A charge valve allows selective communication between the bellows and the vacuum source and a dump valve allows selective communication between the bellows and atmosphere.

A speed signal generating means provides a signal, typically an analog voltage, indicative of actual vehicle speed. A speed set point signal generating means provides a signal, also an analog voltage in a typical circuit, indicative of the desired speed. The dead band is normally provided in association with either the vehicle speed signal generating means or, more commonly, with the speed set point generating means.

A comparator and control means compares the speed set point signal and the vehicle speed signal. If the actual speed exceeds the set speed the dump valve is energized. If the set speed exceeds the actual speed the charge valve is energized. As used herein, speed set point means, where appropriate, speed set point range; the latter term indicating a dead-band with an overspeed "set point" at one end thereof and an underspeed "set point" at the other end thereof.

BRIEF DESCRIPTION OF THE DRAWINGS

While the specification concludes with claims which particularly point out and distinctly claim the subject matter forming the present invention, it is believed that the same will be better understood with the following description of the preferred embodiments taken in conjunction with the accompanying drawings in which:

FIG. 3, shown on the first sheet of the drawings, is a partial schematic representation of a variation of the circuit of FIG. 2.

DESCRIPTION OF THE PREFERRED EMBODIMENTS

Figure 1:
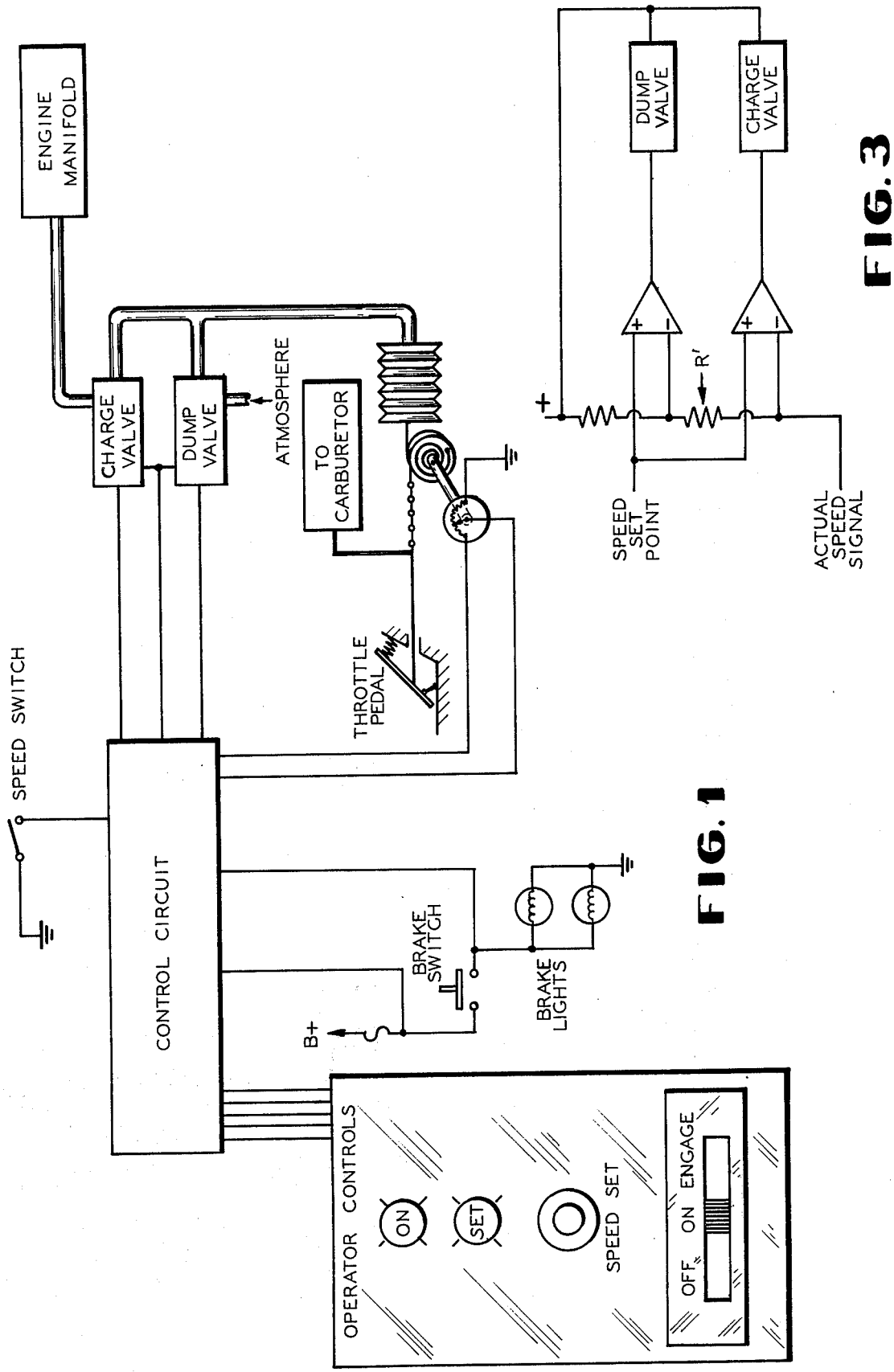
FIG. 1 is a representation of the overall control system of the present invention installed in a motor vehicle.

FIG. 1 of the drawings illustrates the overall speed control system of the present invention and generally indicates the physical location and association of parts.

A bellows is connected to the linkage joining the throttle pedal and carburetor and operates to increase the throttle position when in communication with vacuum source, typically the engine manifold. A charge valve provides selective communication between the manifold and the bellows and is opened by the control circuit when the actual vehicle speed is below the set speed. A dump valve provides selective communication between the bellows and atmosphere and is opened by the control circuit when the actual vehicle speed is above the set speed.

As will be described in more detail hereinafter, a dead-band is provided in the control circuit to provide a vehicle speed range of about + or − ½ M.P.H. over which no control action takes place. When the vehicle speed is in this dead band, both the charge and dump valves are closed. This system, it has been discovered, provides highly satisfactory vehicle speed control while greatly minimizing the amount of atmospheric air entering the engine manifold. For the sake of convenience herein the term set point speed is used. It should be understood, however, that a set point speed range is usually meant; i.e., the set point speed typically comprises a high and low limit to the dead-band. Alternatively, the dead band can be associated with the actual vehicle speed in which case this term is understood to mean the dead-band range within which this variable may vary without initiating control action.

There are five basic inputs to the control circuit of the present invention. A power supply is preferably taken from the load side of the brake light fuse. A brake signal, typically from the load side of the brake light switch, is used to disable the control system upon actuation of the brakes. A vehicle speed signal is provided, preferably in the form of a switch contact which has a closure frequency proportional to actual vehicle speed. In a preferred embodiment, the switch is a reed relay and a magnet rotating with the speedometer cable provides the closure thereof.

The control circuit is actuated by a command from the vehicle operator. For use with the preferred control circuit, an on-off switch is provided together with a momentary contact engage switch which can be integral with the on-off switch. The operator also selects the speed at which the vehicle is to travel. Any of the means known in the art can be used but the preferred means is via a rheostat which can, for instance, be mounted on the end of the vehicle turn signal operator lever along with and preferably integral with the aforementioned momentary contact switch. When a rheostat is used, it preferably does not include graduations correlating its position to vehicle set speed. As is known in the art, it is difficult to calibrate a vehicle speed control system to the varying conditions of the range of vehicles to which it will be applied and the use of a "blind" set point eliminates the need to attempt such calibration, yet provides fully acceptable control.

Preferably, the operator is provided with an "on" reminder light indicating that the circuit is in a condition allowing actuation and a "set" light indicating that the control is operative.

Figure 2:
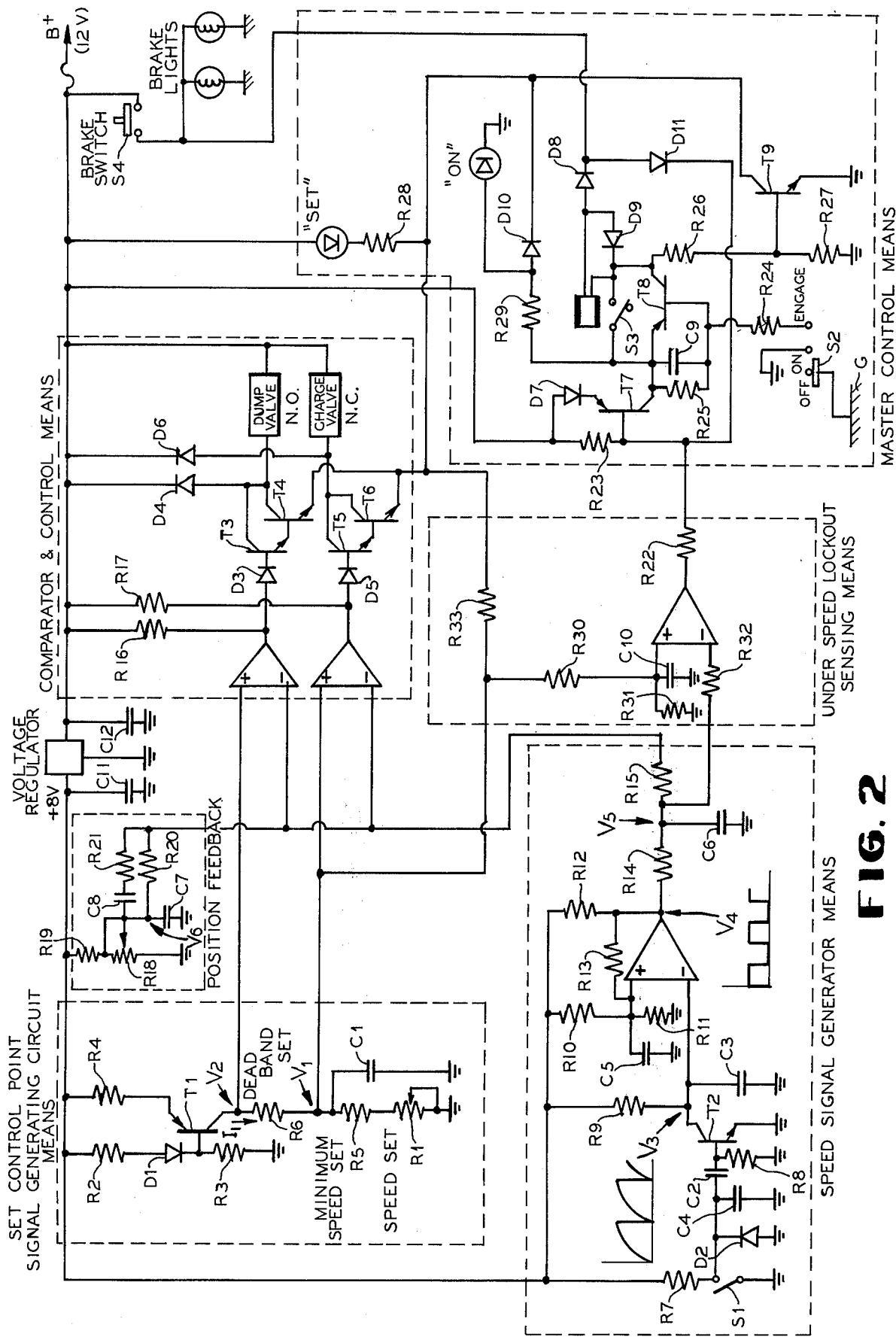
FIG. 2, shown on the second sheet of the drawings, is a schematic control circuit of the present invention.

Turning now to FIG. 2, the preferred control system of the present invention is shown. Broadly, the control consists of six sub-circuits indicated by the dashed-line boxes. The basic sub-circuits are a master control means to turn the system on and off, a set point signal generating means, a speed signal generating means and a means comparing the set and speed signals and controlling the dump and charge valves. A dead-band is provided with appropriate circuitry within the set point, speed signal or comparator means to provide a narrow range of vehicle speed over which no control action takes place.

Preferably a throttle position feedback means is provided to anticipate the effect of changes in throttle position and thereby limit control overshoot. The feedback signal is algebraically added to the vehicle speed signal to provide the desired overshoot control.

To provide smooth operation and additional safety an underspeed lockout means is additionally provided. This prevents actuation of the control if the actual vehicle speed is substantially (about 10 MPH) below the set speed. In addition, the lockout provides a redundant back-up to the action of the brake switch to de-energize the control. Thus, if the brake switch were broken, preventing normal de-activation of the control, braking of the vehicle by about 10 M.P.H. would also de-activate the control.

Each of the sub-circuits will now be discussed in detail.

CONTROL POINT GENERATING CIRCUIT

The speed set point is established by varying the resistance of potentiometer R1. The associated control point generating circuit operates as follows. A voltage divider comprising resistors R2 and R3 and diode D1 is connected between the 8V supply and ground and provides the base voltage for transistor T1. That base voltage biases transistor T1 on and establishes a constant collector current $I_1$ therefrom. The diode D1 is chosen to have a threshold voltage and temperature characteristic comparable to the base to emitter junction of T1, thereby providing a temperature compensated circuit. $I_1$, of course, will be a function of R2, R3, the emitter resistor R4 and to a small degree the gain of T1 and will preferably be about 0.1 ma. The circuit is generally designed so that an analog DC voltage of 0–8 corresponds to a speed range of 0–80 M.P.H.

Current $I_1$ provides a (minimum) set point speed voltage $V_1$ proportional to the sum of resistances of the minimum speed resistor R5 and the speed set resistor R1. Resistor R6 provides a dead-band associated with the set speed circuit and is in series with R5 and R1. To provide a dead-band of about + or − ½ M.P.H. (1 M.P.H. total) R6 will typically be 1000 ohms. Thus $V_2$, the upper speed limit of the dead band, will be 0.1 volts above $V_1$.

Preferably, a means is provided to limit the rate of vehicle acceleration when the set point potentiometer R1 is abruptly changed. Capacitor C1 provides this function by limiting the rate at which $V_1$ and $V_2$ can increase.

SPEED SIGNAL GENERATOR MEANS

Any suitable circuit or device can be used to provide an analog signal proportional to vehicle speed. As shown in FIG. 2 such a system is provided using the frequency of closing of switch S1 as the speed signal. S1 can, for instance, be a reed relay switch operated by a magnet rotating on or in synchronization with the speedometer cable.

Opening $S_1$ imposes +8V on the base of transistor T2 through resistor R7 and coupling capacitor C2. This biases T2 into conduction and brings the collector voltage $V_3$ thereof to virtual ground thereby discharging capacitor C3. T2 then turns off as a result of the discharge of C2 through grounding resistor R8. When T2 turns off $V_3$, on the collector thereof, proceeds upward toward +8V at a rate determined by the RC constant of resistor R9 and capacitor C3 connected thereto. The typical wave form of $V_3$ is illustrated; the period thereof is, of course the period between successive openings of S1 while the shape thereof is dictated by R9C3. Capacitor C4 is provided in parallel with S1 to eliminate the potential effects of switch contact bounce. Diode D2 is provided to protect T2 from reverse voltage transients.

$V_3$ is applied to the negative (inverting) input of a comparator. The positive input of the comparator is held at +4V by the voltage divider comprising equal resistances R10 and R11 connected to the +8V supply. A capacitor C5 grounds electrical noise which would otherwise be present at the positive comparator input. The comparator is of the open collector output and provides a grounded output when the larger input is on the negative connection and a floating output when the larger input is on the positive input. Resistor R12 is connected to the +8V source and therefore provides an approximate +8V signal on the output of the comparator when the positive input is larger. The result of the sawtooth waveform $V_3$ on the negative input of the comparator is a square wave $V_4$ which varies between +8V and 0 and has an on time percentage proportional to R9C3 and the frequency of closure of switch S1; i.e., proportional to vehicle speed.

A small positive feedback is provided via resistor R13 to assure sharp reliable switching of the output of the comparator. A RC network comprising resistor R14 and capacitor C6 converts square wave $V_4$ to its DC average $V_5$ which, as mentioned previously, will vary from 0–8 VDC over a speed range of from 0–80 M.P.H.

COMPARATOR AND CONTROL MEANS $V_5$ is applied through a high impedence input resistor R15 to the negative inputs of a pair of analog to digital comparators in the comparator and control circuit. Such comparators have a digital (on or off, open or closed) output which switches as the magnitude of the two analog inputs switches from one being greater to the other being greater. These comparators compare the actual vehicle speed ($V_5$) with the set point speed ($V_1$ and $V_2$). The dump valve is a normally (i.e., when de-energized) open valve and therefore provides a fail-safe system de-activation. It is normally energized and therefore closed when the vehicle speed is at or under the set speed by the following circuit. At or below the set point speed the negative input to the comparator associated with the dump valve is less than the positive input thereto from the set point circuit. Consequently the comparator output is open and current is allowed to flow via resistor R16 and diode D3 to the base of transistor T3 which, with transistor T4, provides a Darlington pair for high current gain. When the Darlington pair is conducting the dump valve is energized (closed). When the actual vehicle speed exceeds the (upper) set point speed the comparator output goes to ground thereby diverting the base current and turning the Darlington pair T3 and T4 off and opening the dump valve. The diodes D3 and D4 provide protection for the transistors T3 and T4 against base-emitter breakdown and from overvoltage spikes resulting from the field collapse of the dump valve.

A second comparator compares the actual speed with the (lower) set point speed and, when the former is lower than the latter, energizes (opens) the charge valve thereby placing the bellows in communication with the manifold vacuum and increasing the throttle setting. Specifically, this circuit comprises resistor R17, diodes D5 and D6 and transistors T5 and T6 arranged identically to those associated with the dump valve.

DEAD BAND CONSIDERATIONS

In the preferred embodiment of FIG. 2 as hereinbefore described it will be appreciated that the charge and dump valves are operated only when the actual vehicle speed is outside the deadband range established by R6 associated with the set point circuit. This is a particularly preferred embodiment inasmuch as the dead-band is constant irrespective of speed setting due to the constant current ($I_1$) circuit associated with R6. This provides optimum control over the entire speed range and in practice provides very satisfactory control with a minimum of atmospheric bleed to the engine manifold.

Although less preferred, other means can be used to provide the dead band for the control. One alternate system is shown in FIG. 3 which is a partial diagramatic schematic corresponding generally to a portion of FIG. 2. In the variation of FIG. 3 a resistor R' is associated with the actual speed signal and is provided between the two actual speed inputs to the comparators and therefore provides a dead band operation. As will be appreciated, the variation, as illustrated, does not provide a constant width dead band, not varying in width with vehicle speed, and therefore is less preferred.

POSITION FEEDBACK

Returning now to FIG. 2 a means is preferably provided to anticipate the effect of changes in throttle position and minimize or avoid overshoot of the controls. The preferred means is a throttle position feedback circuit. A potentiometer R18 is mounted, as illustrated in FIG. 1, to be moved by the bellows movement and to provide a linear resistance variation with bellows, and therefor throttle, position. Because of the non-linear characteristics of the vehicle speed versus throttle position curve a biasing resistor R19 is provided in series with potentiometer R18 to provide feedback voltage $V_6$ which is approximately linear with the steady-state vehicle speed associated with the actual vehicle speed.

As the throttle position increases in response to energization of the charge valve the wiper moves toward the positive end of the potentiometer. Capacitor C7 shunts the noise from R18 and its associated wiring to the ground. The increase in voltage on the wiper of R18 is seen by the comparators as an increase in actual vehicle speed because of the connection of R20 to the actual vehicle speed (negative) inputs thereof. Additionally, a transient increase in apparent (to the comparators) vehicle speed is provided through the lead network comprising resistor R21 and capacitor C8. As will be appreciated, the relative weight given to the actual speed signal ($V_5$) and the apparent speed signals ($V_6$) from the throttle position feedback circuit is a function of the relative sizes of R15, R18, R19, R20, R21 and C8 and can be adjusted to suit the dynamics of any particular vehicle system.

MASTER CONTROL MEANS

A master control means is provided to turn the system on and off upon the happening of any of several events. As a minimum, the master control must provide for the selective engagement of the system and for the automatic disengagement of the system upon actuation of the brakes.

Resistor R22, as will hereinafter be more fully described, is at virtual ground on its left hand side when the system is operational. In this condition, transistor T7 is switched on through the base voltage supplied by the voltage divider comprising R22 and resistor R23.

The system is energized as follows. The on-off switch S2 provides ground from the vehicle chassis ground G to the control system common ground. A momentary "engage" signal provides a ground to the switch side of resistor R24. While R24 is grounded a current exists through diode D7, T7 and the voltage divider comprising R24 and resistor R25 thereby biasing transistor T8 into conduction. Capacitor C9 provides a shunt across the base to emitter junction of T8 and prevents noise from accidentally biasing T8 into conduction.

When T8 conducts, it provides a current path through the coil of the lock in relay S3 and blocking diode D8 and through the low resistance path provided by the brake lights to ground. Current through this path locks relay S3 in through its own contacts and by passes T8 which stops conducting when the momentary engage contact is released. Diode D9 provides a path for shorting out the reverse current from the coil of S3 upon the deenergization thereof.

Transistor T9 is the system on-off transistor and is biased into conduction by current through T7, relay contact S3 and the voltage divider comprising resistors R26 and R27. As will be noted, conduction through T9 is required to provide a ground path for the dump and charge valves through their associated Darlington pairs of control transistors. T9 also provides the ground path to the "set" pilot light and its load resistor R28 to indicate to the operator that the control system is operating.

When T7 is conducting, but the system is not engaged, the "on" light is energized through resistor R29. When the system is energized the "on" light is shorted by diode D10 to the virtual ground provided by T9.

When the brake switch S4 is closed the brake lights function in the conventional manner. In addition, +12V is imposed through diode D11 on the base of T7 biasing it out of conduction and thereby dropping out relay S3, disabling the system regardless of the position of the "momentary" switch. In this connection, it should be noted that the function of D7 is to provide a voltage drop from +12V to the emitter of T7 equal to the voltage drop from +12V to the base of T7 by D11 thereby assuring that T7 will turn off. Closure of the brake switch S4 also imposes +12V on the ground side of the relay coil of S3 thereby insuring drop-out of that relay.

One very desirable safety circuit is one which prevents engagement of the system when the set point is substantially above the actual vehicle speed and to disable the system should the actual speed drop substantially below the set point. Such a system prevents the control from being engaged inadvertently when the vehicle is traveling at a low speed and provides a backup to the brake switch to disengage the system when braking. Additionally, this circuit drops out the controls should the set point be inadvertently adjusted upwardly abruptly by a substantial amount which could otherwise result in an undesired and potentially dangerous vehicle response.

The under speed disabling feature is provided by a comparator which sees, at its positive input, a fraction of the present set speed voltage $V_1$ as determined by the voltage divider comprising resistors R30 and R31. Normally these resistors will be in a ratio of about 1:4 so that the control action takes place at about 80% of the set speed. In addition R30 and R31 should be large compared to R1 and R5 so as not to load, to any significant extent, the speed set circuit. A capacitor C10 is provided to the set speed input of the under speed cutout to prevent transient noise from disabling the control. The negative input of the under speed disable comparator is connected to the actual vehicle speed signal $V_5$ through a resistor R32 which is preferably matched with R30.

A resistor R33 is preferably provided in the underspeed lockout circuit to provide reliable lock-in of the circuit at the limit of its range. If the actual vehicle speed is extremely close to the lower limit of the under speed disabling circuit it is possible to activate the system, receive confirmation thereof via the "set" light and have the under speed circuit system deactivate before the control increases the actual vehicle speed. To avoid this possible minor annoyance, R33 provides a limited drain on (and therefore lowering of) the set speed signal when the control is energized. Thus if $V_1$ is 5.0 volts before energizing the system it will drop to about 4.9 volts after energization thereby, in effect, locking in the control.

COMPONENTS

A voltage regulator provides the regulated +8 volt supply used in the set point signal generating circuit and the vehicle speed signal generating means. A Motorola MC7808 voltage regulator performs satisfactorily in this capacity. Capacitors C11 and C12 provide transient filtering on the input and output of the power supply.

The four comparators are all contained in a single Motorola MC3302 logic chip. While not shown, the logic chip also includes a ground connection and a +12V connection.

With the circuit shown, the following components provide a highly satisfactory control system:

| Resistors | OHMS |
|---|---|
| R1 | 50 K |
| R2 | 130 |
| R3 | 1 K |
| R4 | 20 K |
| R5 | 62 K |
| R6 | 1 K |
| R7 | 1 K |
| R8 | 10 K |
| R9 | 100 K |
| R10 | 10 K |
| R11 | 10 K |
| R12 | 2.7 K |
| R13 | 220 K |
| R14 | 47 K |
| R15 | 100 K |
| R16 | 4.7 K |
| R17 | 4.7 K |
| R18 | 10 K |
| R19 | 10 K |
| R20 | 560 K |
| R21 | 820 K |
| R22 | 2.7 K |
| R23 | 10 K |
| R24 | 4.7 K |
| R25 | 10 K |
| R26 | 470 |
| R27 | 10 K |
| R28 | 390 |
| R29 | 390 |
| R30 | 1 Meg. |
| R31 | 3.6 Meg. |
| R32 | 1 Meg. |
| R33 | 4.7 Meg. |

All resistors are 1/2 Watt

| Capacitors | microfarads |
|---|---|
| C1 | 1 at 35V |
| C2 | 0.12 |
| C3 | 0.1 |
| C4 | 0.1 |
| C5 | 0.1 |
| C6 | 22 at 25V |
| C7 | 0.1 |
| C8 | 5 at 25V |
| C9 | 0.1 |
| C10 | 0.1 |
| C11 | 10 at 25V |
| C12 | 100 at 25V |

All Capacitors are 100V unless specified otherwise.

Diodes

-continued

| | Type |
|---|---|
| D1 | IN3064 |
| D2 | IN3064 |
| D3 | IN3064 |
| D4 | IN4001 |
| D5 | IN3064 |
| D6 | IN4001 |
| D7 | IN3064 |
| D8 | IN4001 |
| D9 | IN4001 |
| D10 | IN3064 |
| D11 | IN3064 |

| Transistors | Type |
|---|---|
| T1 | 2N3703 |
| T2 | MPS3704 |
| T3 | MPS3704 |
| T4 | 2N3725 |
| T5 | MPS3704 |
| T6 | 2N3725 |
| T7 | 2N3703 |
| T8 | 2N3703 |
| T9 | 2N3725 |

Valves — 12 Volt, 150 ma
Relay S3 — 12V, 20 ma

Indicator Lights — Light Emitting Diodes

Texas Instrument FV-100

Many variations will occur to those skilled in the art, with reference to the foregoing disclosure. The embodiments described are intended to be illustrative and not limiting.

What is claimed is:

1. A speed control for a vehicle having a vacuum source and a vehicle throttle means moveable in two directions to increase and decrease vehicle speed comprising:
   a. a vacuum bellows connected to and operable upon an increase in vacuum therein to move said throttle in the speed increasing direction;
   b. a first valve means operatively connected to selectively communicate between said vacuum source and said vacuum bellows;
   c. a second valve means operatively connected to selectively communicate between said bellows and the atmosphere;
   d. a first speed signal means producing a signal proportional to the desired vehicle speed;
   e. a second speed signal means producing a signal proportional to the actual vehicle speed;
   f. dead-band signal means associated with one of said speed signal means;
   g. comparator means receiving signals from said first and second speed signal means and said dead-band signal means and connected to said valves whereby said first valve provides its said communication when the vehicle speed is too low by reference to said set point speed and said second valve provides its said communication when the vehicle speed is too high with reference to said set point speed and both said first and said second valves do not provide their said communication over a narrow range determined by said dead band; and
   h. a means to maintain said second valve in its said communication when the speed of said vehicle is less than said set speed by more than a predetermined amount.

2. The speed control of claim 1 wherein said comparator means is responsive to the position of said vehicle throttle means as well as to the difference between said set speed and said actual speed.

3. The speed control of claim 1 wherein the set speed signal is provided by a variable resistance and a constant current source applied to said variable resistance.

4. The speed control of claim 1 wherein said second speed signal means comprises a contact adapted to open and close at a frequency proportional to actual vehicle speed and a means to translate said contact closure frequency to a proportional voltage.

5. A speed control for a vehicle having a vacuum source and a vehicle throttle means moveable in two directions to increase and decrease vehicle speed comprising:
   a. a vacuum bellows connected to and operable upon an increase in vacuum therein to move said throttle in the speed increasing direction;
   b. a first valve means operatively connected to selectively communicate when energized between said vacuum source and said vacuum bellows;
   c. a second valve means operatively connected to selectively communicate when de-energized between said bellows and the atmosphere;
   d. a first speed signal means producing a voltage proportional to the desired vehicle speed;
   e. a second speed signal means producing a voltage proportional to the actual vehicle speed;
   f. dead-band signal means associated with one of said speed signal means;
   g. first analog to digital comparator means comparing said first and second speed signal voltages and energizing one of said valves selectively when one of said voltages exceeds the other; and
   h. second analog to digital comparator means comparing one of said first and second speed signal voltages to the combination of the other of said speed signal voltages and a voltage from said dead-band signal means and energizing the other of said valves selectively when one of the signals it is comparing exceeds the other of said signals it is comparing, whereby said first valve provides its said communication when the vehicle speed is too low by reference to said set point speed and said second valve provides its said communication when the vehicle speed is too high with reference to said set point speed and both said first and said second valves do not provide their said communication over a narrow range determined by said dead band.

6. The speed control of claim 5 wherein a means is provided to maintain said second valve in its said communication when the speed of said vehicle is less than said set speed by more than a predetermined amount.

7. The speed control of claim 6 wherein said second speed signal is combined with a signal indicative of the position of said vehicle throttle for comparison with said first speed signal by said first and second analog to digital comparators.

8. The speed control of claim 7 wherein said second speed signal means comprises a contact adapted to open and close at a frequency proportional to actual vehicle speed and a means to translate said contact closure frequency to a proportional voltage.

9. The speed control of claim 8 wherein the set speed signal is provided by a variable resistance and a constant current source applied to said variable resistance.

* * * * *